(12) United States Patent
Swoboda et al.

(10) Patent No.: US 7,886,198 B2
(45) Date of Patent: Feb. 8, 2011

(54) METHOD AND SYSTEM OF IDENTIFYING OVERLAYS USED BY A PROGRAM

(75) Inventors: Gary L. Swoboda, Sugar Land, TX (US); Oliver P. Sohm, Toronto (CA); Brian Cruickshank, Oakville (CA); Manisha Agarwala, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1304 days.

(21) Appl. No.: 11/383,424

(22) Filed: May 15, 2006

(65) Prior Publication Data

US 2007/0006172 A1 Jan. 4, 2007

Related U.S. Application Data

(60) Provisional application No. 60/681,427, filed on May 16, 2005, provisional application No. 60/681,561, filed on May 16, 2005.

(51) Int. Cl.
*G06F 11/00* (2006.01)
(52) U.S. Cl. ...................................... 714/45
(58) Field of Classification Search ..................... 714/45
See application file for complete search history.

(56) References Cited

U.S. PATENT DOCUMENTS 5,278,962 A * 1/1994 Masuda et al. .............. 711/207
5,459,869 A * 10/1995 Spilo .......................... 719/324
5,604,849 A * 2/1997 Artwick et al. .............. 345/423
2002/0184477 A1* 12/2002 Swaine et al. ............... 712/227
2005/0210275 A1* 9/2005 Homing et al. ............. 713/190

OTHER PUBLICATIONS

Swain. Andrew and Horley, John; "ARM Summary of New Features in ETMv3"; Jan. 31, 2005; 14 pp.; Document No. PRD08-PRDC-003049 3 2; © ARM Limited 2004-2005.
"ETM 10 (Rev 0) Technical Reference Manual"; 94 pp,: Document No. ARM DDI 0206A; © 2001 ARM Limited.

* cited by examiner

*Primary Examiner*—Scott T Baderman
*Assistant Examiner*—Yair Leibovich
(74) *Attorney, Agent, or Firm*—Robert D. Marshall, Jr.; W. James Brady; Frederick J. Telecky, Jr.

(57) ABSTRACT

A method and system of identifying overlays used by a program. The overlays may be executable overlays (e.g., overlay programs and dynamically linked library programs), or the overlays may be data sets. Depending on the number of overlays and/or the type of information used to identify the overlays, an indication of the identity of the overlays may be written to a register (whose contents are inserted into the trace data stream), or the indication may comprise an entry in a log buffer and an index value written to the register (again whose contents are inserted into the trace data stream, and where the index value identifies the entry in the log buffer).

22 Claims, 2 Drawing Sheets

METHOD AND SYSTEM OF IDENTIFYING OVERLAYS USED BY A PROGRAM

This application claims the benefit of Provisional Application Ser. No. 60/681,427 filed May 16, 2005, entitled "Debugging Software-Controlled Cache Coherence," and Provisional Application Ser. No. 60/681,561, filed May 16, 2005, entitled, "Debugging Application with Overlays, Run-Time Relocatable Code and Multi-Task", both of which are incorporated by reference herein as if reproduced in full below.

BACKGROUND

In order to look for errors in software programs (an activity referred to as "debugging"), some software development tools provide the ability to record the sequence of operations that a processor performed while executing a program. This is referred to as tracing the execution of the program, and the information that is captured is referred to as trace data. The trace data may comprise data such as addresses of the sequence of operational codes (opcodes) executed by the processor, values of various processor registers at each executed opcode, and information in log files written by the traced program.

Some traced programs, however, use overlays and dynamically linked library (DLL) programs. Overlays are sequences of code and/or data bytes that are stored in slower (and thus less expensive) memory and are linked to run at a common address range in faster (and thus more expensive) memory, called an 'overlay region'. When a program determines that it needs access to the content associated with an overlay, the program copies the overlay into the faster memory so that that overlay aligns with the addresses at which the overlay was configured to run. Overlays are used in time-critical applications where deterministic operation of the program is required, deterministic in this case refers to the ability of the programmer to determine ahead of time the worst-case path through a program, how much time it will take to execute the worst case path, and thus to determine the longest amount of time to execute the code. The hardware cache systems found in modern processors are often unsuitable for situations where determinism is needed because interrupts, task switches or other events that occur during the execution of a program evict various address regions from cache, causing the instructions of the evicted addresses to execute more slowly the next time they are accessed.

In systems using overlays, over time a plurality of overlay programs may execute from the same series of addresses. For a trace-debug program looking only at the sequence of addresses executed by the processor it is difficult to determine which overlay was executed. Similarly, DLL programs are linked at run time, and thus the addresses of the instructions of a DLL program are not known until run time, making it difficult for a trace-debug program to know which DLL program was executed just by looking at the series of executed addresses of trace data.

SUMMARY

The problems noted above are solved in large part by a method and system of identifying overlays used by a program. At least some of the illustrative embodiments are integrated circuits comprising a processing circuit that executes instructions, a first memory operatively coupled to the processing circuit (the first memory having an overlay region where addresses of bytes in the overlay region are different than when the bytes are stored outside the first memory), a trace circuit operatively coupled to the processing circuit (the trace circuit gathers trace data comprising addresses of executed instructions, and wherein the trace circuit is configured to send the trace data to a debug-trace program), and a memory location operatively coupled to the trace circuit (wherein the trace circuit is configured to send a value in the memory location to the debug-trace program only when the value is newly written). Each time the bytes are placed in the overlay region, the processing circuit writes an index value to the memory location (the index value indicative of an identity of the bytes in the overlay region).

Other illustrative embodiments are a computer-readable medium storing an overlay manager program that, when executed by a processor, causes the processor to selectively copy bytes from a main memory to an overlay region of a first memory (the bytes stored in the main memory at addresses different than where the overlay manager program places the bytes in the first memory), write an indication of the identity of the bytes to a log buffer, and write a value to a register (the value a pointer to a location within the log buffer where the indication is placed).

Yet still other illustrative embodiments are a computer-readable medium storing a debug-trace program that, when executed by a processor, causes the processor to obtain trace data relating to execution of a traced program in a target device (the trace data comprising an index value to a log buffer), obtain entries from a log buffer within the target device (the entries written during execution of the traced program), identify an entry in the log buffer based on the index value, and identify an overlay program executed during the traced program based on the entry.

Other illustrative embodiments are methods comprising executing a first overlay program from a first portion of a first memory, copying a second overlay program to the first portion of the first memory, executing the second overlay program from the first portion of the first memory, writing an indication of the identity of the second overlay program to a log buffer, and writing an index value into a register, the index value indicative of a location in the log buffer of the indication.

Finally, other illustrative embodiments are methods comprising accessing data in a first overlay portion (the first overlay portion in a first portion of a first memory), copying data in a second overlay portion to the first portion of the first memory, and writing an indication of the identity of the overlay portion to a register whose contents are accessible to a debug-trace program.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
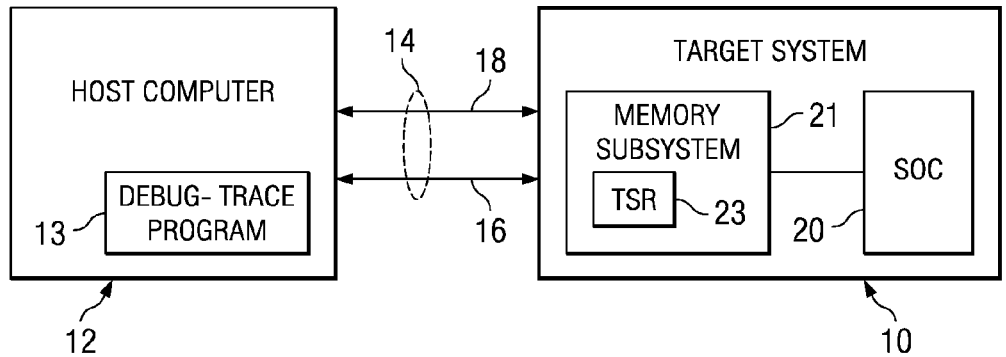
FIG. 1 shows a system in accordance with embodiments of the invention.

FIG. 1 illustrates a software development system 100 in accordance with embodiments of the invention. The software development system 100 comprises a target system 10 coupled to a host computer 12. The target system 10 may be any processor-based system upon which a software programmer would like to test and/or debug a computer program. The target system 10 may be, for example, a cellular telephone, a BLACKBERRY® device, or a computer system. In some embodiments, the host computer 12 executes a program that is used to debug, and in some cases gather trace data and produce data displays, and thus is referred to herein as a debug-trace program 13.

The host computer 12 and target system 10 couple by way one or more interconnects 14, such cables. In some embodiments, the host computer 12 couples to target system 10 by way of a multi-pin cable 16, such as a Mictor cable available from Tektronix Tex., LLC of Richardson, Tex. The multi-pin cable 16 enables transfer of trace data files from the target system 10 to the host computer 12. In alternative embodiments, the host computer 12 couples to the target system 10 by way of a serial cable 18 across which the host computer 12 communicates with the joint test action group (JTAG) communication system of target system 10. A JTAG-based communication between the host computer 12 and target system 10 has lower bandwidth than a multi-pin connection through illustrative cable 16. In yet still further alternative embodiments, the multi-pin cable 16 may have two or more pins dedicated to JTAG-based communication, an thus the host computer 12 and target system 10 may communicate using multiple protocols, yet over the same multi-pin cable 16. In yet still other embodiments, the trace data may be captured on the target system and transferred to the host computer by any of a variety of now existing or after developed transport protocols, which allow the host computer to interact over a distance such that the host computer and target system need not be co-located (e.g., Ethernet, transmission control protocol/internet protocol (TCP/IP), institute of electrical and electronic engineers (IEEE) 1391 protocol, RS-232, and peripheral components interconnect (PCI)).

Figure 2:
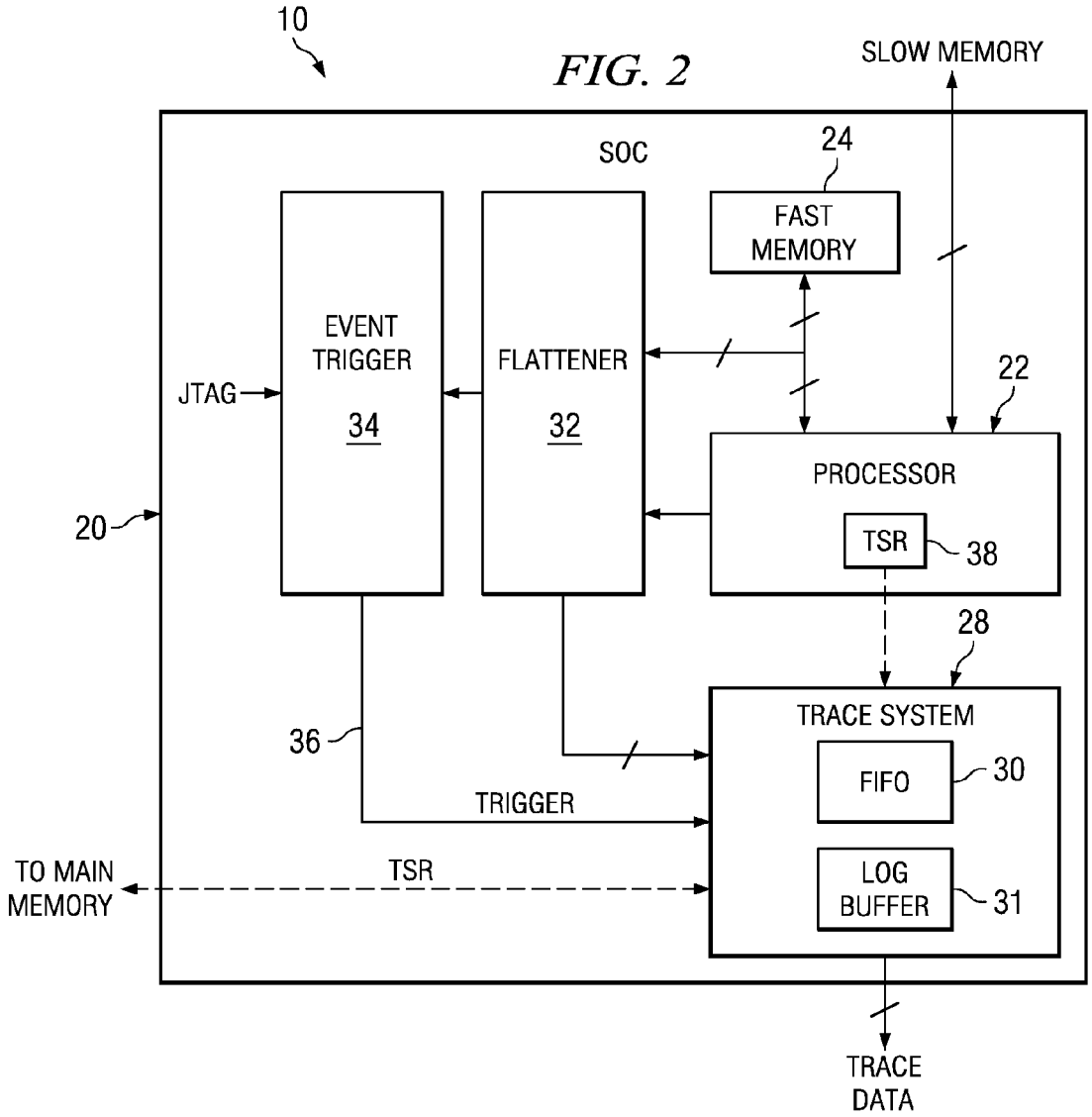
FIG. 2 shows, in greater detail, a target system in accordance with embodiments of the invention.

FIG. 2 shows in greater detail a portion of the target system 10. In particular, a target system 10 in accordance with at least some embodiments comprises a System-On-A-Chip (SOC) 20. The SOC 20 is so named because many devices that were previously individual components are integrated on a single integrated circuit. For example, the SOC 20 may comprise one or more processors 22, fast memory 24, and other devices (e.g. memory controllers, and specialty processors such as digital signal processors). In accordance with embodiments of the invention, the SOC 20 also comprises a trace system 28. The trace system 28 comprises a First In-First Out buffer 30 in which trace data is gathered, and the trace data is sent to the host computer 12 (FIG. 1) by the trace system 28. Because the processor 22 may perform a plurality of parallel operations, the SOC 20 also comprises a data flattener circuit 32. As the name implies, the data flattener circuit 32 gathers the pertinent trace data from the processor's execution pipeline, serializes or "flattens" the trace data so that events that execute at different stages in the pipeline are logged in the correct sequence, and forwards the trace data to the FIFO buffer 30 in the trace system 28. A non-limiting list of the various data points the data flattener 32 may read, serialize and then provide to the FIFO buffer 30 is: direct memory access (DMA) trace data; fast memory trace data; addresses of opcodes executed by the processor 22; the value of hardware registers in the processor 22; and interrupts received by the processor 22.

Still referring to FIG. 2, the integrated circuit SOC 20 further comprises an event trigger system 34. The event trigger system 34 couples to the data flattener 32 and receives a least a portion of the serialized data. In response to various pre-programmed triggers (where such triggers may be communicated to the event trigger system 34 by way of JTAG-based communications), the event trigger system 34 asserts a trigger signal 36 to the trace system 28. In response, the trace system 28 accumulates trace data in its FIFO buffer 30 and sends the trace data to the host computer 12 (FIG. 1). In some embodiments the trace system 28 additionally compresses the trace data from the FIFO buffer 30 prior to sending the trace data to the host computer 12.

Referring simultaneously to FIGS. 1 and 2, a user of the host computer system 12 wishing to debug a software program executable on the target system 10 enables the event trigger system 34, possibly by JTAG-based communication over the serial communication cable 18. Thereafter, the user initiates the target program on the target system 10. The processor 22 executes the target program, while the data flattener 32 gathers pertinent information, serializes the information, and forwards it both the event trigger system 34 and the trace system 28. At points in time before the trace system 28 is enabled by the event trigger system 34, the data supplied to the trace system 28 by the flattener 32 may be ignored, discarded or collected such that the trace data comprises events just prior to the trigger. At a point in execution of the target or traced program, the trigger events occur and the trigger events are identified by the event trigger system 34. The event trigger system 34 asserts the trigger signal 36 to the trace system 28. In response, the trace system 28 collects the trace data in the FIFO buffer 30 (possibly together with events that occur prior to the trigger). Simultaneously, the trace system 28 sends the trace data to the host computer 12. In embodiments where all or substantially all the events after the assertion of the trigger signal 36 are part of the trace data, the trace system 28 sends the trace data over the relatively high bandwidth multi-pin cable 16. In yet still other embodiments, sending of the trace data from the target system 10 to the host computer 12 may be accomplished by sending data over both the JTAG-based communication and the relatively high bandwidth communication across multi-pin connector 16. Other embodiments comprise sending the data over an optical interconnect to the host computer, or logging the captured trace data in a memory or disk that is accessible by the target processor where it can be accessed by another program running on the target processor (e.g., accessed by an embedded software debugging program).

Figure 3:
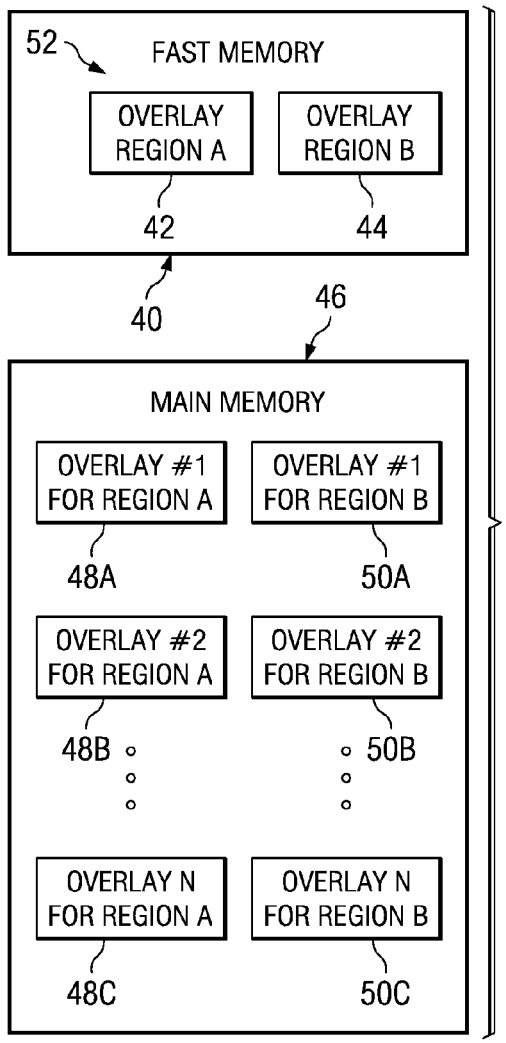
FIG. 3 conceptually shows the relationship between overlay regions and overlays.

FIG. 3 conceptually shows the relationship between overlay regions and overlays. In particular, FIG. 3 shows a portion of fast memory 40, which could be the fast memory 24 on the same integrated circuit as the processor 22 (FIG. 2). The fast memory 40 in this illustrative case has two overlay regions, overlay region A 42 and overlay region B 44. FIG. 3 further shows a portion of main memory 46 which has stored therein various overlays. In particular, overlays 48A through 48C are overlays for overlay region 42. Likewise, overlays 50A through 50C are overlays for overlay region 44. In the main memory 46, the overlays are stored at different addresses than where placed in the fast memory. While only three overlays are shown for each overlay region, any number of overlays may be equivalently used.

Consider for purposes of explanation that each of the overlays 48 and 50 are executable programs. Before execution, an overlay manager copies each overlay to its respective overlay region. For example, an overlay manager copies overlay 48A to the overlay region 42, and the processor begins execution of the overlay at the starting address 52. At some other point in time, possibly while the processor executes programs in the overlay region 44, the overlay manager copies the overlay 48B to the overlay region 42, and the processor begins execution again at the starting address 52. Thus, from a trace data perspective where the trace data contains the addresses of the executed instructions (and where the debug-trace program externally correlates object code versions of the programs to the executed addresses), there is no easily discernable difference between the multiple overlays as they are executed from the same addresses.

Now consider that the overlays 48 and 50 are data sets. Before the processor accesses data from the data sets, the overlay manager copies each overlay to is respective overlay region. For example, an overlay manager copies overlay 48A to the overlay region 42, and the processor begins accessing the data in the data set from the overlay at the starting address 52. At some other point in time, possibly while the processor accesses data from the overlay region 44, the overlay manager copies the overlay 48B to the overlay region 42, and the processor begins accessing the data set again at the starting address 52. From a trace perspective, where the trace data contains the address of the access data (and where the debug-trace program correlates based on other files), there is no easily discernable difference between the multiple overlays as they are accessed.

In order to assist the user of the debug-trace program (executed on the host computer 12 or as an embedded debugger) in differentiating overlays (whether programs or data) in accordance with embodiments of the invention, the trace system 28 is configured to insert into the trace data values indicative of the identity of the copied/executed overlays. The debug-trace program receives the trace data including the values indicative of the identity of the overlays, which enables the debug-trace program to correlate the addresses to the object files for the overlays, or other files containing the data sets.

Referring to FIG. 2, the trace system 28 obtains the values indicative of the identity of the overlays from a target state register (TSR). In some embodiments the target state register is a hardware register located within the processor 22, such as target state register 38. Although the hardware register version of the target state register 38 is shown to couple to the trace system 28 (by way of a dashed line), it will be understood that the value of the target state register may, in actuality, be supplied to the trace system after passing through the data flattener 32. A hardware register in the processor 22 may be equivalently referred to as an opcode addressable register. In alternative embodiments, the target state register may be a register outside the processor. For example, and referring briefly to FIG. 1, the SOC 20 may couple to a memory subsystem 21 which implements the target state register 23. In these alternative embodiments, the target state register 23 may be readable by a memory operation to an assigned address, and thus target state register 23 may be referred to as a memory addressable register. In yet still other embodiments, the memory subsystem 21 may be integrated with other devices of the SOC 20.

The trace system 28 is configured to send the value in the target state register to the host computer 12 only when the value in the target state register is newly written. Once the target state register has been newly written and not yet read, it becomes the highest priority data item for the trace system 28 to capture, preempting other types of data. Preempting is done to ensure that the information in the target state register (in this case the overlay information) is stored earlier in the captured trace data than the traced values that rely on this information for disambiguation (e.g., correlating program counter values to particular overlay instructions). If the trace stream is disabled for a period of time (e.g., while waiting for a trigger to occur or while waiting for the debugging system to initiate a read of the information), attributing higher priority to the information in the target state register 23, 38 ensures that the last value written into the target state register will be presented first in the trace stream once trace data capture is again active. In embodiments where the trace system 28 couples to the host computer 12 by way of the relatively high bandwidth connection, the trace system 28 is configured to monitor the value in the target state register and send the value to the host computer system 12 in a message wrapping protocol that identifies to the host computer 12 that the information is the value of the target state register.

In accordance with at least some embodiments of the invention, when the overlay manager writes an overlay 48, 50 to its respective overlay region 42, 44, the overlay manager also writes a value to the target state register that is indicative of the identity of the overlay 48, 50. In embodiments were only a single overlay region exists, and where the number of possible overlays is relatively low, the overlay manager writes the value indicative of the identity of the overlay to the target state register in any predetermined fashion. In situations where there are two or more overlay regions (yet where there are still a relatively low number of possible overlays), the various portions of the target state register may be divided into sections, one section each applicable to each overlay.

Figure 4:
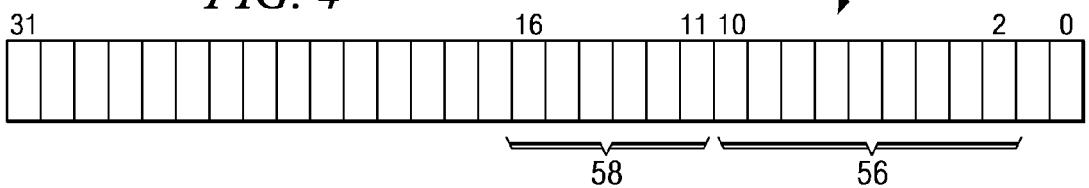
FIG. 4 shows a target state register in accordance with at least some embodiments.

FIG. 4 shows, at the bit level, a target state register 23, 38 in accordance with some embodiments of the invention. In particular, in order to differentiate values indicative of the identity of the overlays in the various overlay regions, the bits of the target state register may be logically divided, each grouping of bits applicable to a particular overlay region. For example, the grouping 56 (bits 2 through 10) may be applicable to overlay region 44 (FIG. 3). Values written to grouping 56 are thus indicative of the identity of the overlays for overlay region 44. With grouping 56 having nine bits, the grouping 56 may be used to identify $2^9$ possible overlays. Likewise, grouping 58 (bits 11 through 16) may be applicable to overlay region 42 (FIG. 3). Values written to grouping 58 are thus indicative of the identity of the overlays for overlay region 42. With grouping 58 having six bits, the grouping 58 may be used to identify $2^6$ possible overlays. Although FIG. 4 shows the target state register 23, 38 having two groupings, any number of groupings may be used, limited only by the number of bits in the target state register and the number of possible overlays in each grouping. When the number of overlay regions becomes large, when the number of possible overlays becomes large, or when further information is desirable (e.g., starting address of DLL programs), alternative methods are used.

Now consider that each of the overlays 48 and 50 are executable programs in the form of DLL programs. Just before execution, each DLL program is copied to its respective overlay region and then dynamically linked (e.g., unresolved address references that refer to run-time addresses within the DLL program are resolved to use the corresponding run-time addresses in the overlay region). As with overlay programs, there is a difficulty in identifying which DLL program is in the overlay region during execution from looking at the captured trace data alone. Identification of DLL-type overlays is further complicated by the fact that the execution starting addresses for each DLL program is not known until run time, and may change with each instantiation. Thus, for a debug-trace program to identify a particular DLL program and correlate the addresses from the trace data to the object code version, the debug-trace program uses an identifier for the DLL program, as well as the particular starting address. In target systems 10 where the target state register 23, 38 is thirty bits wide, the addressing is based on sixteen bit addresses, and only one possible overlay region exists, it is possible to write the DLL identifier and the starting address to the target state register. However, if there are two or more possible overlay regions, the target state register may have an insufficient number of bits to contain all the desirable information. Moreover in the case of non-DLL overlay programs and data sets, where the number of groupings is large and/or the number of possible overlays is large, the target state register may have an insufficient number of bits to contain all the desirable information.

In order to address these concerns, and in accordance with some embodiments, the overlay program writes an indication of the identity of the overlay (and in the case of the overlay being a DLL program, the starting address) to a log buffer. A log buffer may be equivalently referred to as a data table, data array and/or data structure. In some embodiments, data from the log buffer is read out by the host computer 12 after execution of the target or traced program has stopped. In situations where the log buffer does not contain a sufficient number of storage locations to store all the log data written during a trace period (e.g., log buffer has too few locations, or the log buffer is circular and the number of entries expected will overwrite earlier entries during the trace period), the log buffer may be read by the host computer 12 one or more times during the trace period to ensure all the entries generated are available to the debug-trace program.

In some embodiments, the trace system 28 (FIG. 2), in addition to the FIFO buffer 30, implements a series of memory locations 31 to be the log buffer. In alternative embodiments, the log buffer is located in random access memory, either on the SOC 20 or in a separate area, such as memory subsystem 21 (FIG. 1). Regardless of the precise location of the log buffer, the host computer 12 has access to the log buffer and can read data from the log buffer as described above.

The logical construction of the log buffer may take many forms. In some embodiments, the log buffer is implemented as a plurality of equivalently sized data fields. In alternative embodiments, the log buffer is implemented as a plurality of arbitrary sized data fields. In yet still other embodiments, the log buffer is a table having a plurality of rows and columns. Regardless of the logical construction of the log buffer, in accordance with embodiments of the invention each entry in the log buffer comprises an indication of the identity of the overlay, a starting address where applicable, and an index value. The index value is an index into the log buffer that identifies the location of the entry in the log buffer. The index value could be, for example, a pointer, packet number, sequence number, row number or any other value indicative of the location of the entry. In some embodiments, the index value is an inherent part of the entry, and in other embodiments the index value is generated and written by the overlay manager.

In addition to writing the indication of the identity of the overlay, the starting address where applicable, and possibly the index value, the overlay manager in accordance with embodiments of the invention also places the index value in the trace data by writing the index value into the target state register 23, 38. Writing the index value into the target state register contemporaneously with writing the log buffer ensures that the index value is present in the trace data associated with the traced program. In accordance with embodiments of the invention, the debug-trace program in host computer 12 reads the index value from the trace data, indexes into the log buffer data based on the index value, and thus obtains sufficient information to identify the overlay (and for DLL-type overlays, the starting address) such that the debug-trace program can then correlate the object data to the executed addresses in the trace data. In cases where the log buffer can be read while the processor 22 is running, the log buffer can be periodically read and emptied by the host computer so that the buffer size does not limit the amount of information that can be captured. Systems that use DLLs can reduce the amount of memory used for the log buffer by only writing the DLL information to the log buffer when the DLL is loaded into a run-time address for the first time. Once the buffer entry is established, the index value to the entry can be written into the target state register each time that DLL is loaded. Embodiments where the log buffer is only written the first time a DLL program in instantiated means the processor scans through the log buffer to determine if the DLL has been previously loaded to a particular address, but since the process of dynamic linking is itself time-consuming the additional processing time to scan the log buffer is acceptable.

Figure 5:
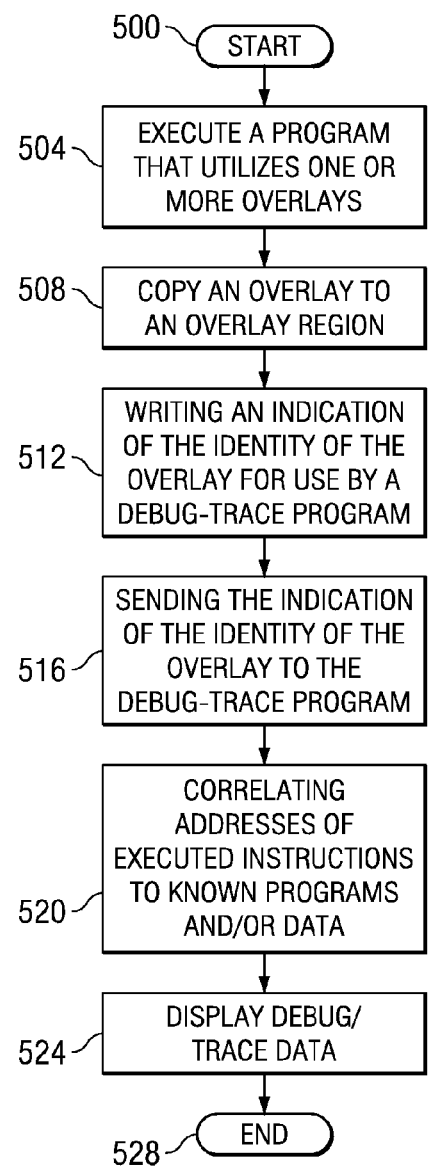
FIG. 5 shows a method in accordance with embodiments of the invention.

FIG. 5 illustrates a method in accordance with embodiments of the invention. In particular, the method starts (block 500) and proceeds to executing a program in a target device, the program utilizing one or more overlays (block 504). The overlays may be non-DLL as well as DLL-type overlay programs, and the overlays may also be non-executed data sets. During execution of the target or traced program, at least one of the overlays is copied to an overlay region in the target system (block 508). In the case of non-DLL overlay programs and data sets, the copying may be to a predetermined location. In the case of DLL-type overlays, the location to which the overlay is copied (its execution starting point) may be dynamically determined. Contemporaneous with copying of the overlay, an indication of the identity of the overlay program is written for use by a debug-trace program (block 512). In some embodiments, the indication is written to the target state register 21, 38. In alternative embodiments, the indication is information written to a log buffer (possibly with a starting address) along with an index value written to the target state register 21, 38. Thereafter, the indication of the identity of the overlay program is sent to the debug-trace program (block 516). With regard to the values in the target state register 21, 38, these values are sent to the debug-trace program each time the data in the target state register is newly written. In embodiments where some of the information used to identify the overlay is written to the log buffer, the log buffer may be read after execution of the traced program has stopped, or during execution of the traced program. Once the log buffer has been read by the debug-trace program, the buffer is emptied. Embodiments that allow the log buffer to be read while the traced program is executing reduce the size of the buffer used to capture a given amount of information.

Based on the information from the target state register and/or the log buffer, the debug-trace program correlates the addresses of executed instructions (or accessed data) from the trace data to object code versions of the executed programs (or data sets) (block 524). Once correlated, the trace data (e.g., augmented with opcodes of and comments from the object code file) is displayed for the user of the debug-trace program (block 524), and the process ends (block 528).

From the description provided herein, those skilled in the art are readily able to combine software created as described with appropriate general purpose or special purpose computer hardware to create a computer system and/or computer subcomponents embodying the invention, to create a computer system and/or computer subcomponents for carrying out the method of the invention, and/or to create a computer-readable medium for storing a software program to implement the method aspects of the invention. The computer-readable medium may be, for example, a volatile memory, a non-volatile memory, a compact disc read only memory (CDROM), an electrically erasable programmable read only memory (EEPROM), a hard drive, or the like.

The above discussion is meant to be illustrative of the principles and various embodiments of the present invention. Numerous variations and modifications will become apparent to those skilled in the art once the above disclosure is fully appreciated. For example, although the discussion has assumed that the overlay manager program is responsible for writing the target state register and/or the log buffer, in alternative embodiments the overlay program itself may write the pertinent information when executed. For non-DLL overlay programs, the starting address may be known and thus hard coded. The first few instructions of the overlay could write the target state register and/or log buffer. For DLL overlay programs, the DLL program may have to comprise instructions to determine, on each instantiation, the starting address. It is intended that the following claims be interpreted to embrace all such variations and modifications.

What is claimed is:

1. An integrated circuit comprising:
   a processing circuit that executes instructions;
   a first memory operatively coupled to the processing circuit, the memory having an overlay region where addresses of bytes in the overlay region are different than when the bytes are stored outside the first memory;
   a trace circuit operatively coupled to the processing circuit, the trace circuit gathers trace data comprising addresses of executed instructions, and wherein the trace circuit is configured to send the trace data to a debug-trace program; and
   a memory location operatively coupled to the trace circuit, wherein the trace circuit is configured to send a value in the memory location to the debug-trace program, while preempting capture of other data, only when the value is newly written;
   wherein each time the bytes are placed in the overlay region, the processing circuit writes an index value to the memory location, the index value indicative of an identity of the bytes in the overlay region.

2. The integrated circuit as defined in claim 1 further comprising:
   wherein the overlay region of the first memory is configured to hold bytes of an overlay program; and
   wherein the index value written by the processing circuit is indicative of the identity of the overlay region.

3. The integrated circuit as defined in claim 2 further comprising:
   wherein the processing circuit is configured to write an indication of the identity of the overlay program to a log buffer; and
   wherein the index value written by the processing circuit is indicative of the location in the log buffer of the identity of the overlay program.

4. The integrated circuit as defined in claim 1 further comprising:
   wherein the overlay region of the first memory is configured to hold bytes of a dynamically linked library (DLL) program;
   wherein the processing circuit is configured to write an indication of the identity of the DLL program, and a run address of the DLL program, to a log buffer; and
   wherein the index value written by the processing circuit is indicative of the location in the log buffer of the identity of the overlay program.

5. The integrated circuit as defined in claim 1 further comprising:
   wherein the overlay region of the first memory is configured to hold bytes of a data set; and
   wherein the index value written by the processing circuit is indicative of the identity of the data set.

6. The integrated circuit as defined in claim 5 further comprising:
   wherein the processing circuit is configured to write an indication of the identity of the data set to a log buffer; and
   wherein the index value written by the processing circuit is indicative of the location in the log buffer of the identity of the data set.

7. A computer-readable medium storing an overlay manager program that, when executed by a processor, causes the processor to:
   selectively copy bytes from a main memory to an overlay portion of a first memory, the bytes stored in the main memory at addresses different than where the overlay manager program places the bytes in the first memory;
   write an indication of the identity of the bytes to a log buffer;
   write a value to a register, the value being a pointer to a location within the log buffer where the indication is placed; and
   trigger a trace system to capture the value in the register prior to capturing addresses for the bytes in the first memory.

8. The computer-readable medium as defined in claim 7 wherein when the processor selectively copies, the overlay manager program causes the processor to copy an overlay program to the overlay portion of the first memory.

9. The computer-readable medium as defined in claim 7 wherein when the processor selectively copies, the overlay manager program causes the processor to copy a dynamically linked library (DLL) program to the overlay portion of the first memory.

10. The computer-readable medium as defined in claim 7 wherein when the processor selectively copies, the overlay manager program causes the processor to copy a set of data to the overlay portion of a cache memory.

11. A computer-readable medium storing a debug-trace program that, when executed by a processor, causes the processor to: obtain trace data stored in a trace buffer during execution of a traced program in a target device, the trace data comprising an index value to a log buffer; obtain entries from the log buffer within the target device, the entries written during execution of the traced program; identify an entry in the log buffer based on the index value; and identify an overlay program executed during the traced program based on the entry.

12. The computer-readable medium as defined in claim 11 wherein when the processor obtains entries the debug-trace program causes the processor to obtain entries after execution of the traced program has stopped.

13. The computer-readable medium as defined in claim 11 wherein when the processor obtains entries the debug-trace program causes the processor to obtain entries during execution of the traced program.

14. The computer-readable medium as defined in claim 11 wherein when the processor identifies the overlay program the debug-trace program causes the processor to identify the overlay program based on an indication of the identity of the overlay program in the log buffer.

15. The computer-readable medium as defined in claim 14 wherein when the processor identifies the overlay program the debug-trace program causes the processor to identify the overlay program based on an address where execution was started on the overlay program.

16. A method comprising:
   executing a first overlay program from a first portion of a first memory;
   copying a second overlay program to the first portion of the first memory;
   writing an indication of the identity of the second overlay program to a log buffer;
   writing an index value into a register, the index value indicative of a location in the log buffer of the indication;
   executing the second overlay program from the first portion of the first memory; and
   triggering a trace system to capture the index value in the register prior to capturing addresses for the executing second overlay program.

17. The method as defined in claim 16 wherein writing the indication further comprises writing the indication by an overlay manager.

18. The method as defined in claim 17 wherein writing further comprises writing a starting address of the second overlay program to the log buffer.

19. The method as defined in claim 16 wherein writing the indication further comprises writing the indication by the second overlay program.

20. A method comprising:
   accessing data in a first overlay portion, the first overlay portion in a first portion of a first memory;
   copying data in a second overlay portion to the first portion of the first memory;
   accessing the data in the second overlay portion from the first portion of first memory;
   writing an indication of the identity of the second overlay portion to a register whose contents are accessible to a debug-trace program; and
   capturing, with highest priority, the contents of the register for inclusion in trace data provided to the debug-trace program.

21. The method as defined in claim 20 wherein writing further comprises writing the indication to a register whose value is supplied to the debug-trace program when the registers is newly written.

22. The method as defined in claim 20 wherein writing an indication further comprises:
   writing a value to a log buffer, the value indicative of the identity of the second overlay portion; and
   writing the indication to the registers, the indication indicative of a location in the log buffer where the value was written.

* * * * *